United States Patent
Chung et al.

(10) Patent No.: US 7,802,047 B2
(45) Date of Patent: Sep. 21, 2010

(54) UNIVERSAL SERIAL BUS DEVICE AND UNIVERSAL SERIAL BUS SYSTEM INCLUDING THE SAME

(75) Inventors: Chang-Mo Chung, Yongin-si (KR); Jun-Haeng Cho, Seongnam-si (KR); Yon-Suk Kim, Daejeon (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 35 days.

(21) Appl. No.: 12/253,785

(22) Filed: Oct. 17, 2008

(65) Prior Publication Data
US 2009/0125665 A1 May 14, 2009

(30) Foreign Application Priority Data
Nov. 20, 2007 (KR) .................. 10-2007-0115037

(51) Int. Cl.
*G06F 13/00* (2006.01)
(52) U.S. Cl. ...................................... 710/313
(58) Field of Classification Search .......... 710/313, 710/314
See application file for complete search history.

(56) References Cited

U.S. PATENT DOCUMENTS

| | | | |
|---|---|---|---|
| 2006/0117127 A1* | 6/2006 | Milan et al. | 710/313 |
| 2007/0030517 A1 | 2/2007 | Narayanan | |
| 2007/0157020 A1 | 7/2007 | Lee et al. | |
| 2007/0180181 A1* | 8/2007 | Chen et al. | 710/313 |
| 2007/0204069 A1* | 8/2007 | Bhesania et al. | 710/8 |
| 2007/0300004 A1* | 12/2007 | Yun | 710/313 |
| 2008/0005395 A1* | 1/2008 | Ong et al. | 710/36 |
| 2008/0162741 A1* | 7/2008 | Christison et al. | 710/18 |
| 2008/0215774 A1* | 9/2008 | Kim et al. | 710/62 |

FOREIGN PATENT DOCUMENTS

| | | | |
|---|---|---|---|
| JP | 2006-164081 | | 6/2006 |
| JP | 2007-279834 A | * | 10/2007 |
| KR | 10-2007-0008590 | * | 5/2007 |
| KR | 1020070073037 A | | 7/2007 |
| KR | 1020070075874 A | | 7/2007 |

OTHER PUBLICATIONS

English language machine translation of JP2007-279834A.*
English language machine translation of KR 10-2007-0008590.*
Association Models Supplement to the Certified Wireless Universal Serial Bus Specification; Mar. 2, 2006, Revision 1.0.
Wireless Universal Serial Bus Specification; May 12, 2008, Revision 1.0.

* cited by examiner

*Primary Examiner*—Glenn A Auve
(74) *Attorney, Agent, or Firm*—Volentine & Whitt, P.L.L.C.

(57) ABSTRACT

A Universal Serial Bus (USB) device includes an internal circuit and an interface circuit. The interface circuit is configured to interface the internal circuit and an external device for wireless USB (WUSB) communication and USB communication. The interface circuit includes a WUSB module enabling the WUSB communication, an on-the-go (OTG) module enabling the USB communication, and an interface module configured to selectively control the WUSB module and the OTG module to interface the internal circuit and the external device for the WUSB communication and the USB communication.

8 Claims, 6 Drawing Sheets

UNIVERSAL SERIAL BUS DEVICE AND UNIVERSAL SERIAL BUS SYSTEM INCLUDING THE SAME

PRIORITY STATEMENT

A claim of priority is made to Korean Patent Application No. 10-2007-0115037 filed on Nov. 12, 2007, in the Korean Intellectual Property Office, the subject matter of which is hereby incorporated by reference.

SUMMARY

The present invention relates to a Universal Serial Bus (USB) device, more particularly, to a wireless USB communication device.

A USB is a peripheral device of a computer and is widely used as an interface. It includes features such as plug and play (PnP), automated allotment of identification and hot plug, which are not included in a conventional parallel bus. A USB cable only has four lines, including two signal lines, a power line and a ground line. Therefore, cables and connectors may be made smaller, which reduces production cost. Also peripheral devices may similarly be developed at lower cost.

As USB may be applied to various devices, it is becoming standard for connecting peripheral devices to personal computers and lap-top computers. Many recent peripheral devices and portable devices use the USB.

As local wireless technology suitable for connection between devices becomes more widely used, Ultra Wide Band (UWB) is gaining attention as a wireless communication technique. An important application of UWB technology is enabling wireless communications by use of USB 2.0, for example, which is a high-speed serial interface. The specification for wireless communication using USB 2.0 addresses adaptation to conventional software sources. For example, a "wire adaptor" may be used with respect to interfacing conventional USB hosts and devices wireless, as they are.

Exemplary embodiments of the present invention provide a Universal Serial Bus (USB) device that includes an internal circuit and an interface circuit. The interface circuit is configured to interface the internal circuit and an external device for wireless USB (WUSB) communication and USB communication. The interface circuit includes a WUSB module enabling the WUSB communication, an on-the-go (OTG) module enabling the USB communication, and an interface module configured to selectively control the WUSB module and the OTG module to interface the internal circuit and the external device for the WUSB communication and the USB communication.

Other exemplary embodiments of the present invention provide a USB system including a USB host, a USB device configured to connect to the USB host and a dongle configured to connect to each of the USB host and the USB device. The dongle connects to the USB host to exchange connection context (CC) with the USB host, and connects to the USB device to provide the exchanged CC to the USB device. The USB device includes an internal circuit and an interface circuit configured to interface the internal circuit and at least one of the USB host and the dongle for wireless USB (WUSB) communication and USB communication.

BRIEF DESCRIPTION OF THE DRAWINGS

The embodiments of the present invention will be described with reference to the attached drawings, in which.

DETAILED DESCRIPTION OF THE EMBODIMENTS

Figure 1:
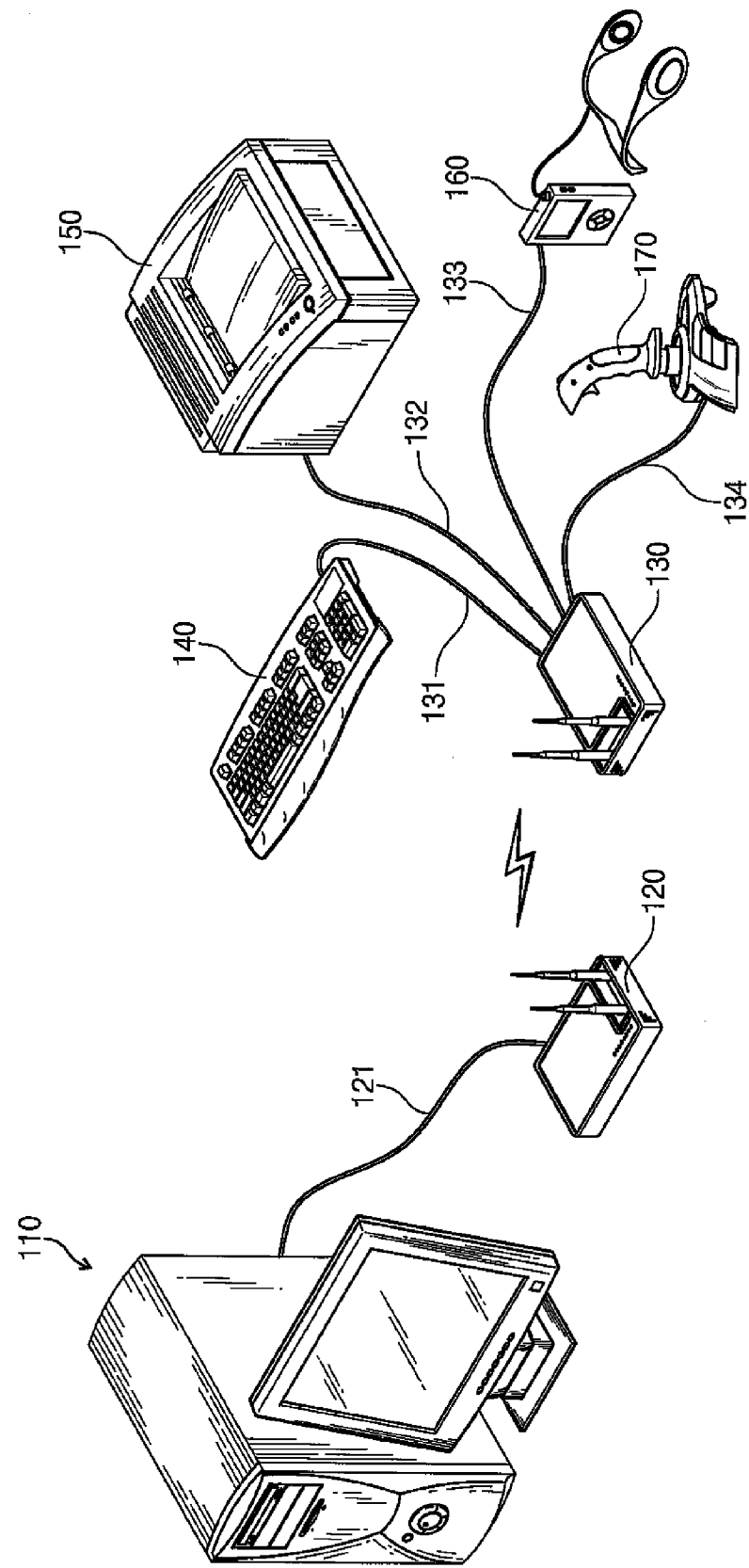
FIG. 1 illustrates examples of wire adapters in Wireless Universal Serial Bus Specification, Revision 1.0.

The present invention will now be described more fully with reference to the accompanying drawings, in which exemplary embodiments of the invention are shown. The invention, however, may be embodied in various different forms, and should not be construed as being limited only to the illustrated embodiments. Rather, these embodiments are provided as examples, to convey the concept of the invention to one skilled in the art. Accordingly, known processes, elements, and techniques are not described with respect to some of the embodiments of the present invention. Throughout the drawings and written description, like reference numerals will be used to refer to like or similar elements.

FIG. 1 illustrates examples of wire adapters in Wireless Universal Serial Bus Specification, Revision 1.0. Wireless-USB will be referred to as WUSB, hereinafter.

Referring to FIG. 1, a host 110 and exemplary devices 140, 150, 160 and 170 may communicate wirelessly through wire adapters, such as Host Wire Adapter (HWA) 120 and Device Wire Adapter (DWA) 130, respectively. The host 110 and the HWA 120 are connected by means of USB connection 121, and the DHA 130 and the devices 140 to 170 are connected by means of USB connections 131-134, respectively.

When a user wishes to initially connect the USB host 110 and the USB devices 140 to 170 by means of WUSB, a process for interconnection called "association" is required between the USB host and the USB devices. According to "Association Models Supplement to the Certified Wireless Universal Serial Bus Specification," Revision 1.0 (Mar. 2, 2006), the contents of which are hereby incorporated by reference, a "Cable Association Model" and a "Numeric Association Model" may be used for associating a host and devices.

The Cable Association Model requires a cable for connecting the host 110 and the DWA 130 or the devices 140 to 170. The Numeric Association Model requires the devices 140 to 170 to each have a key pad. However, there typically is no key pad for input of numbers in devices such as a printer, a mouse, or a digital camera. Therefore, the use of the Numeric Association Model is limited.

Currently, the HWA 120 and the DWA 130 are needed to enable WUSB communication between the host 110 and the devices 140-170. Enabling WUSB communication between the host 110 and the devices 140-170 without the HWA 120 and the DWA 130 would be more efficient.

Figure 2:
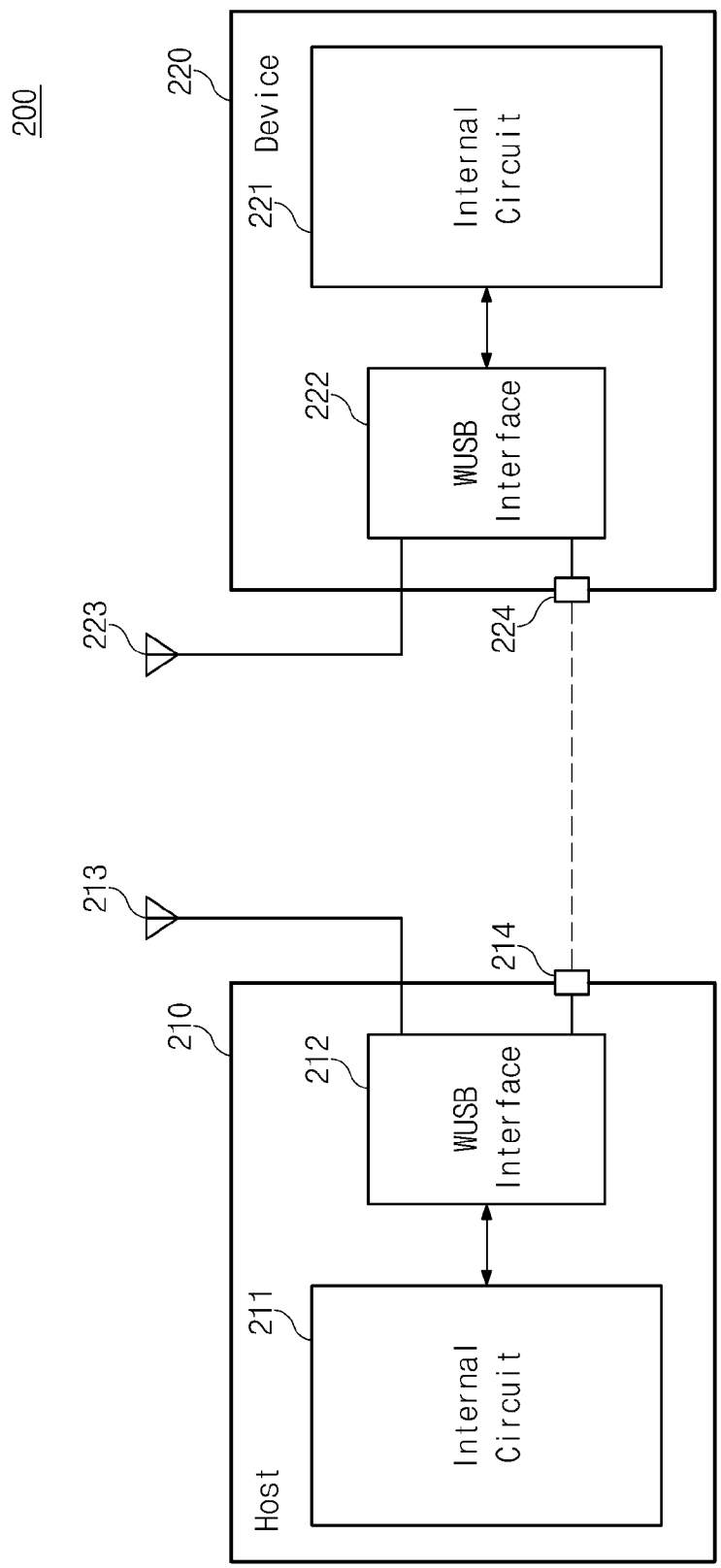
FIG. 2 is a block diagram illustrating a USB system, according to an exemplary embodiment of the present invention.

FIG. 2 is a block diagram illustrating a USB system according to an exemplary embodiment of the present invention.

Referring to FIG. 2, a USB system 200 includes a USB host 210 and a USB device 220. The USB host 210 and the USB device 220 have configurations which are able to communicate through USB and WUSB, respectively.

The USB host 210 includes an internal circuit 211, a WUSB interface 212, an antenna 213, and a USB connector 214. The internal circuit 211 is configured to perform the functionality of the USB host 210. For example, when the host 210 is a personal computer, the internal circuit 211 may include a processor, a memory, a memory controller, a buffer, a clock generator, input/output device, and the like. The WUSB interface 212 provides an interface that enables the internal circuit 211 and the USB device 220 to conduct WUSB communication by means of antennas 213 and 223, and/or USB communication by means of connectors 214 and 224, respectively.

The USB device 220 includes an internal circuit 221, a WUSB interface 222, an antenna 223, and a USB connector 224. The internal circuit 221 is configured to perform the functionality of the USB host 210. For example, when the USB device 210 is a digital camera, the internal circuit 221 may include a processor, a memory, a memory controller, a Digital Signal Processor (DSP), a buffer, a clock generator, an input/output device, and the like. The WUSB interface 222 provides an interface that enables the internal circuit 211 and the USB device 220 to conduct WUSB communication by means of antennas 213 and 223, and/or USB communication by means of connectors 214 and 224. The USB device 220 may include one or more portable devices, such as a personal digital assistant (PDA), MP3 player, portable video game, memory stick, and the like, or one or more computer peripheral devices, such as mouse, keyboard, printer, scanner, joystick, card reader, and the like.

In accordance with the USB system 200 of the present embodiment, at an initial association between the USB host 210 and the USB device 220, WUSB communication is conducted by connecting the USB connector 214 of the USB host 210 and the USB connector 224 of the USB device 220, exchanging connection context (CC) by means of USB communication, and disconnecting the connectors 214 and 224. The configuration of the USB host 210 and the USB device 220 enables WUSB/USB communication without using a separate wire adapter, and is readily able to perform association.

Figure 3:
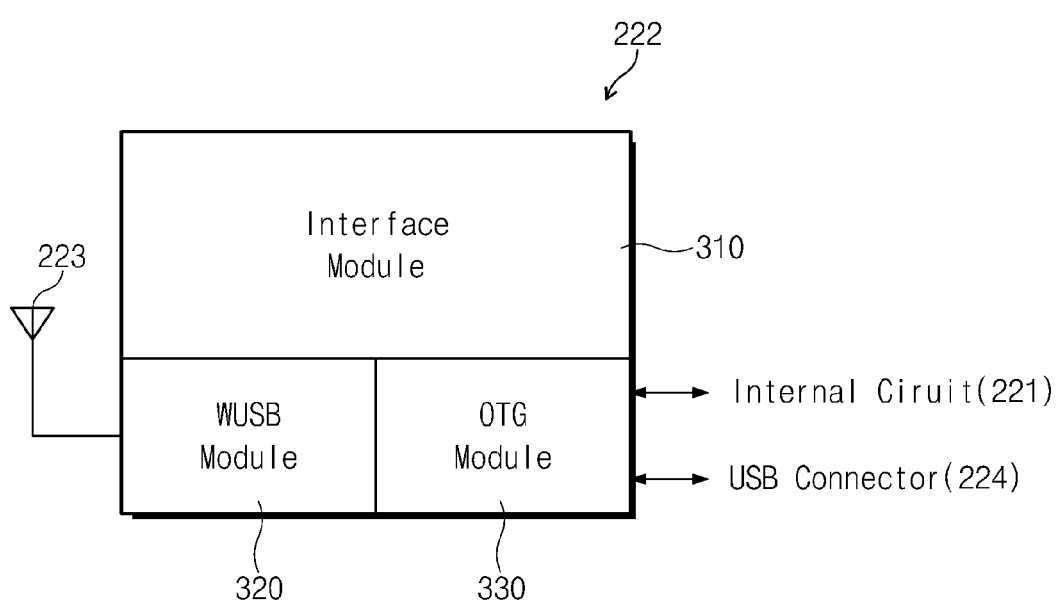
FIG. 3 is a block diagram illustrating a WUSB interface of FIG. 2, according to an exemplary embodiment of the present invention.

FIG. 3 is a block diagram illustrating a configuration of the WUSB interface 222 of FIG. 2, according to an exemplary embodiment of the present invention.

Referring to FIG. 3, the WUSB interface 222 includes an interface module 310, a WUSB module 320, and an on-the-go (OTG) module 330. As will be appreciated by those skilled in the art, the functionality of each of the modules may be implemented, for example, as software, logic circuits, or combinations thereof.

The WUSB module 320 interfaces for WUSB communication between the internal circuit 221 of FIG. 2 and an external device, such as the host 210. The OTG module 330 controls the USB communication between the internal circuit 221 and the external device. The interface module 310 controls the WUSB module 320 and the OTG module 330 to perform a control function for smooth WUSB/USB communication between the internal circuit 221 and the external device.

As portable devices, such as PDAs (personal digital assistants), MP3 players, cellular phones, portable video games, and the like, become more prevalent, there is increasing demand for direct connection between such devices without using a personal computer. OTG-supplementation provides limited-host functionality to satisfy such demand. In other words, the OTG module 330 enables data transfer between peripheral devices, between a peripheral device and a portable device, or between portable devices, without using a separate host.

When the USB device 220 is connected with the host 210 by means of the USB connector 224, the host 210 and the OTG interface 330 have a "host-device" relationship. Also, when the USB device 220 is connected with the host 210 by means of the USB connector 224, or when the USB device 220 communicates through WUSB with the host 210 by means of the antenna 223, the OTG interface 330 and the internal circuit 221 of the USB device 220 have a "host-device" relationship. In other words, the OTG interface 330 is designed to operate as a "host" or a "device," according to the operation mode.

In accordance with the exemplary embodiment of the present invention, when the connector 224 of the USB device 220 is connected to the connector 214 of the host 210 for association, the host 220 and the internal circuit 221 in the USB device 220 communicate in a USB manner by means of the OTG module 330. After the association operation is completed, the internal circuit 221 of the USB device 220 communicates using WUSB with the host 210 by means of the antenna 223. Here, the interface module 310 in the WUSB interface 222 controls incoming signals such that a signal received from the antenna 223 is transferred to the internal circuit 221 through the WUSB module 320 and the OTG module 330, in this order. On the other hand, the interface module 310 controls outgoing signals such that a signal output from the internal circuit 221 is transferred to the host 210 through the OTG module 330 and the WUSB module 320, in this order.

Figure 4:
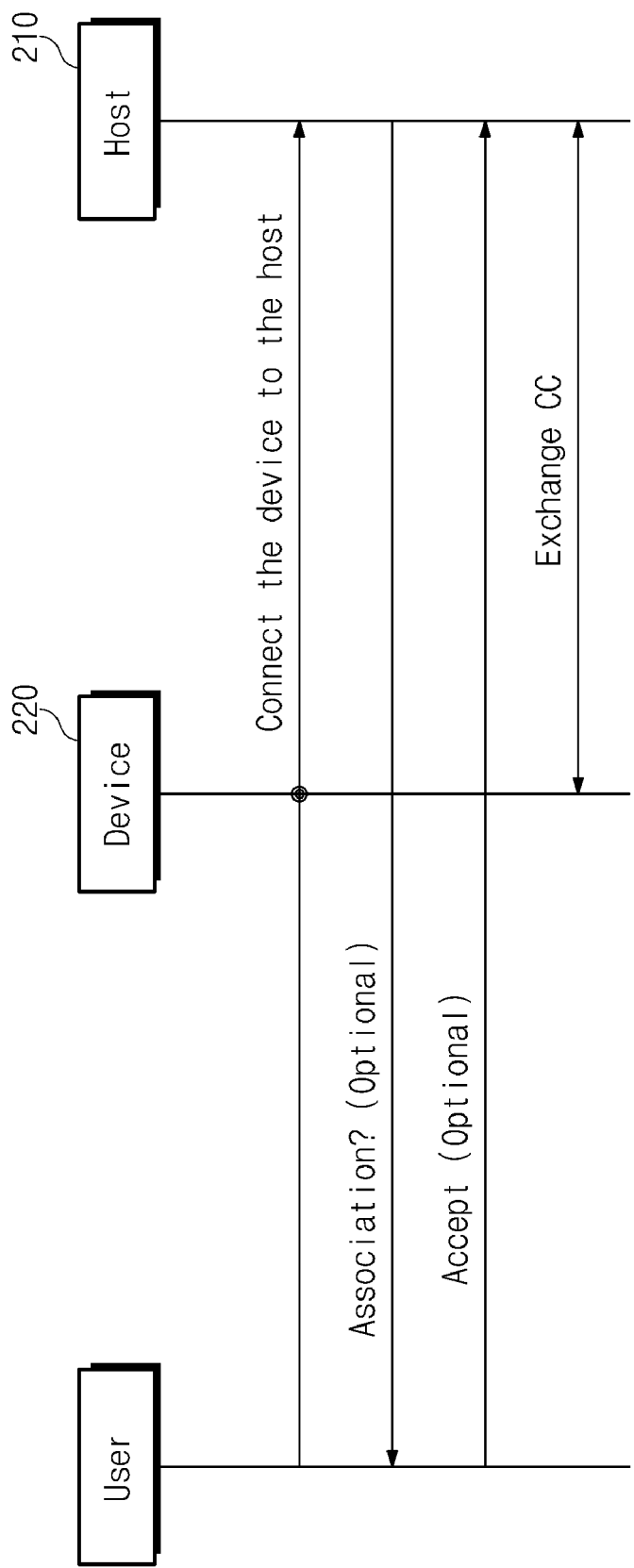
FIG. 4 is a flow diagram illustrating an association process of the USB system of FIG. 2, according to an exemplary embodiment of the present invention.

FIG. 4 is a flow diagram illustrating an association process of the USB system of FIG. 2, according to an exemplary embodiment of the present invention.

Referring to FIG. 4, host 210 and device 220 are associated for a WUSB communication between the host 210 and the device 220. In order to make the association, the connector 224 of the device 220 is connected to the connector 214 of the host 210. This connection may be initiated, for example, by a user. When the host 210 recognizes that the device 220 is connected, it inquires the user whether to perform association between the device 220 and the host 210. When the user accepts or authorizes the association, connection context (CC) is exchanged between the host 210 and the device 220. For example, as described in "Wireless Universal Serial Bus Specification," Revision 1.0 (May 12, 2005), the contents of which are hereby incorporated by reference, the CC may include connection host ID (CHID), connection device ID (CDID), and connection key (CK).

In an embodiment, the above-described authorization process may be performed, for example, when a specific button (not shown) of the device 220 is pushed or otherwise selected by the user. In other words, when the host 210 recognizes the connection of the device 220 and inquires whether to perform association, the user may express authorization by pressing the specific button of the device 220. In other exemplary embodiments, the user may authorize association using input devices, such as a key pad or mouse connected to the host 210.

Also, in other exemplary embodiments, the authorization process steps of FIG. 4, asking to the user whether to perform association with the device 220 and waiting for the user's authorization, may be omitted. In other words, when the device 220 is connected to the host 210, like the PnP function, the host 210 automatically carries out CC exchange with the device 220 for association.

When the CC exchange between the host 210 and the device 220 is completed, the user may separate the device 220 from the host 210. Then the host 210 and the device 220 are able to perform WUSB communication.

The USB device of various embodiments of the present invention thus enables WUSB communication with the host without using a wire adapter. Furthermore, the USB device may readily form association with the host.

Figure 5:
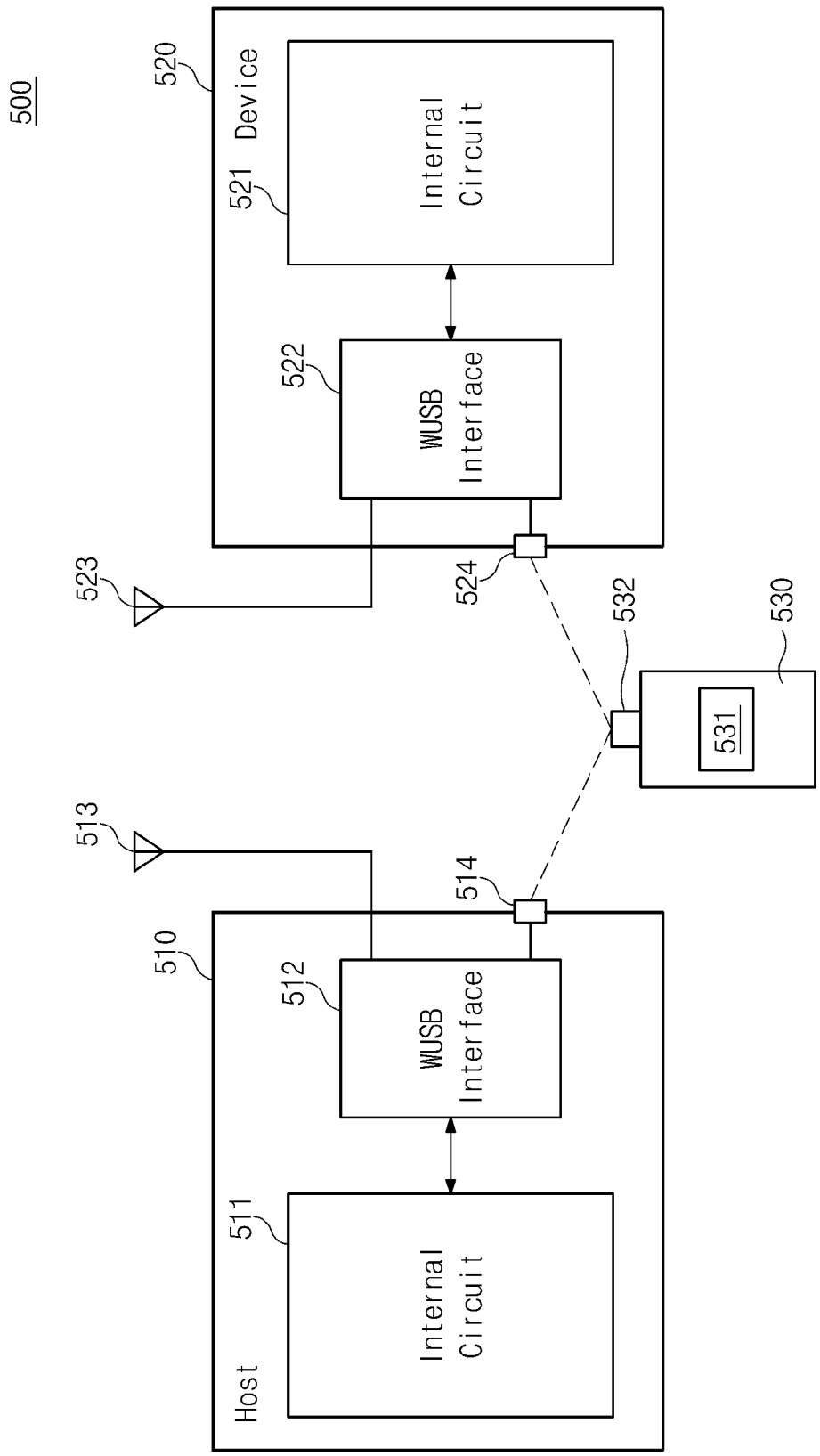
FIG. 5 is a block diagram illustrating a USB system, according to another exemplary embodiment of the present invention.

FIG. 5 is a block diagram illustrating a USB system, according to another exemplary embodiment of the present invention.

Referring to FIG. 5, a USB host 510 and a USB device 520 have similar configurations as the USB host 210 and the USB device 220 of FIG. 2, respectively. That is, internal circuit 511, WUSB interface 512, host antenna 513, internal circuit 521, WUSB interface 522 and device antenna 523 may be configured similarly to internal circuit 211, WUSB interface 212, host antenna 213, internal circuit 221, WUSB interface 222 and device antenna 223, respectively. However, the USB host 510 and the USB device 520 connect by means of a USB dongle 530, instead of through connectors 214 and 224, as shown in FIG. 2.

The USB dongle 530 includes an interface circuit 531 and a connector 532. The interface circuit 531 is configured to enable CC exchange with the USB host 510 and the USB device 520. When the USB device 520 is a large-sized peripheral device, such as a printer or a scanner, for example, it may not be easy to directly connect the device 520 to the host 510 for association. Therefore, the USB dongle 530 of the present embodiment includes circuit configuration for CC exchange, and enables association between the USB device 520 and the USB host 510 by connecting the USB dongle 530 to the USB host 510 and the USB device 520 alternately, instead of directly connecting the USB device 520 to the host 510.

Figure 6:
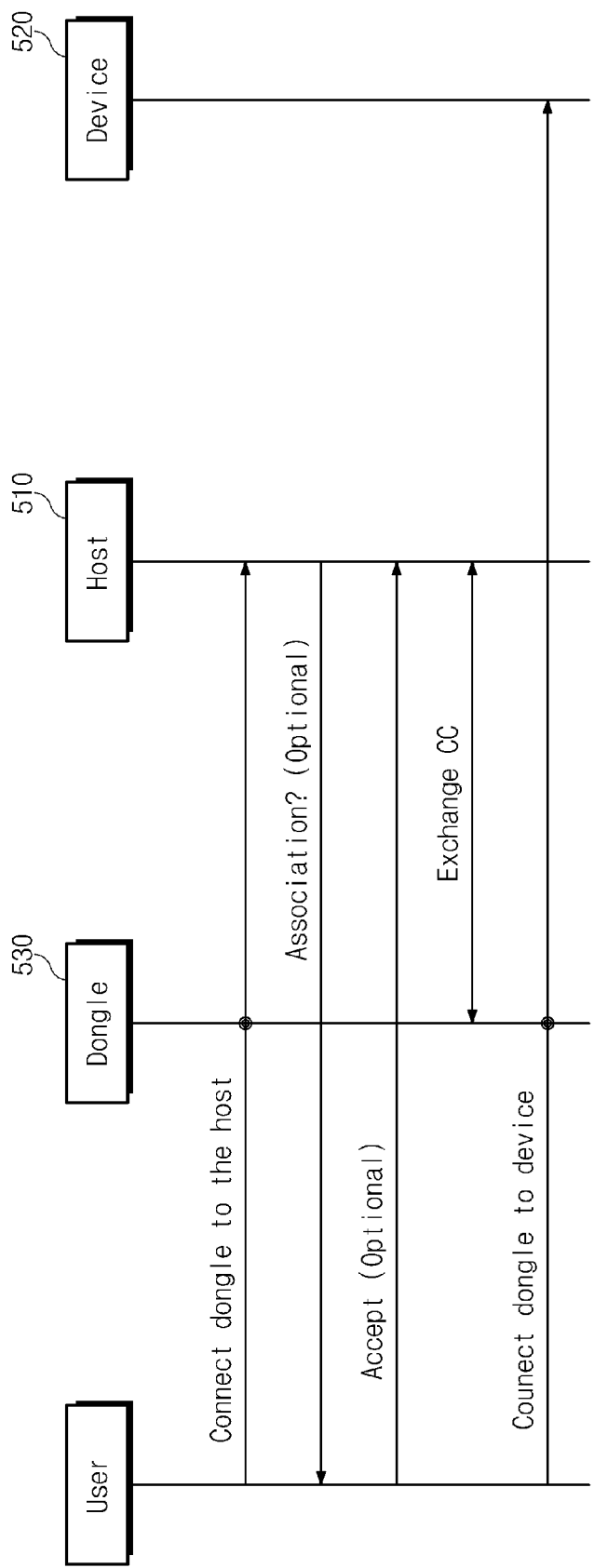
FIG. 6 is a flow diagram illustrating an association process of the USB system of FIG. 5, according to an exemplary embodiment of the present invention.

FIG. 6 is a flow diagram illustrating an association process of the USB host 510 and the USB device 520 using the USB dongle 530 of FIG. 5, according to an exemplary embodiment of the invention.

Referring to FIG. 6, the dongle 530 is connected to the host 510 through connectors 532 and 514, respectively, to make the association. This connection may be initiated, for example, by a user. The host 510 recognizes that the dongle 530 is connected and asks the user whether association may be made with the dongle 530. When the user accepts or authorizes the association, the host 510 performs CC exchange with the dongle 530, which stores the CC information in a memory (not shown). In other exemplary embodiments, it is possible to skip the authorization process of asking the user whether to make association and accepting association by the user, and to carry out the CC exchange automatically.

When the CC exchange between the host 510 and the dongle 530 is complete, the user may connect the dongle 530 to the USB device 520 through connectors 532 and 524, respectively. The USB device 520 refers to the CC information stored in the dongle 530, enabling it to perform WUSB communication with the host 510.

The interface circuit 531 included in the dongle 530 may be designed to have a configuration similar to that of the WUSB interface 222, for example, as shown in FIG. 3. In another exemplary embodiment, the interface circuit 531 included in the dongle 530 may be configured only to conduct CC exchange. When the interface circuit 531 included in the dongle 530 has a similar configuration to the WUSB interface 222 of FIG. 3, the USB device 520 may communicate through WUSB with the host 510 through either the WUSB interface 522 or the interface circuit 531 in the dongle 530.

As described above, when the device 520 is a large-sized peripheral device, such as a printer or a scanner, for example, the association between the USB device 520 and the USB host 510 may be performed more conveniently by connecting the USB dongle 530 to the USB host 510 and the USB device 520 alternately, instead of directly connecting the device 520 to the host 510.

While the present invention has been shown and described in connection with exemplary embodiments thereof, it will be apparent to those skilled in the art that various modifications can be made without departing from the spirit and scope of the invention as defined by the appended claims.

What is claimed is:

1. A Universal Serial Bus (USB) device comprising:
   an internal circuit; and
   an interface circuit configured to interface between the internal circuit and an external device for wireless USB (WUSB) communication and USB communication,
   wherein the interface circuit comprises:
      a WUSB module enabling the WUSB communication;
      an on-the-go (OTG) module enabling the USB communication; and
      an interface module configured to selectively control the WUSB module and the OTG module to interface between the internal circuit and the external device for the WUSB communication and the USB communication.

2. The USB device of claim 1, further comprising:
   a USB connector configured to connect the external device and the OTG module.

3. The USB device of claim 2, wherein the external device comprises one of a host or a device capable of performing the WUSB communication.

4. The USB device of claim 3, wherein the USB device exchanges connection context (CC) with the external device, when the external device and the OTG module are connected by the USB connector.

5. A Universal Serial Bus (USB) system comprising:
   a USB device configured to be connected to a USB host; and
   a dongle configured to connect with each of the USB host and the USB device, the dongle connecting to the USB host to exchange connection context (CC) with the USB host, and connecting to the USB device to provide the exchanged CC to the USB device,
   wherein the USB device comprises:
      an internal circuit; and
      an interface circuit configured to interface between the internal circuit and the USB host for wireless USB (WUSB) communication and between the internal circuit and the dongle for USB communication.

6. The USB system of claim 5, wherein the interface circuit of the USB device comprises:
   a WUSB module configured to enable the WUSB communication;
   an on-the-go (OTG) module configured to enable the USB communication; and
   an interface module configured to selectively control the WUSB module and the OTG module to interface the internal circuit with the USB host and the dongle for the WUSB communication and the USB communication.

7. The USB system of claim 6, wherein the interface circuit of the USB device further comprises:
   a USB connector configured to connect the OTG module to the dongle.

8. The USB system of claim 7, wherein the USB device is configured to exchange the CC with the dongle, when the dongle and the OTG module are connected by the USB connector.

* * * * *